United States Patent [19]

Schneider et al.

[11] 4,314,185
[45] Feb. 2, 1982

[54] CONTROL CIRCUIT FOR AN AUTOMATED PRESS SYSTEM

[75] Inventors: Franz Schneider, Göppingen; Burkhard Schumann, Ottenbach, both of Fed. Rep. of Germany

[73] Assignee: L. Schuler GmbH, Ottenbach, Fed. Rep. of Germany

[21] Appl. No.: 131,197

[22] Filed: Mar. 17, 1980

[30] Foreign Application Priority Data

Mar. 16, 1979 [DE] Fed. Rep. of Germany ....... 2910399

[51] Int. Cl.³ .............................................. G05B 11/18
[52] U.S. Cl. ....................................... 318/85; 101/43; 318/590
[58] Field of Search ................. 318/571, 590, 568, 85; 100/43

[56] References Cited

U.S. PATENT DOCUMENTS

| | | | |
|---|---|---|---|
| 3,199,439 | 8/1955 | Danly | 318/85 X |
| 3,553,547 | 1/1971 | Heiberger | 318/85 |
| 3,668,498 | 6/1972 | Austin | 318/85 |
| 4,062,213 | 12/1977 | Schneider et al. | 100/43 X |

*Primary Examiner*—B. Dobeck
*Attorney, Agent, or Firm*—Craig and Antonelli

[57] ABSTRACT

In automated press systems it is desirable to be able to control the actuators of an automation system associated with the press based on the speed of the press. To accomplish this, a circuit arrangement is provided which includes a pulse generator for producing a coded signal indicating the position of the press based on a press speed signal. An evaluation circuit having a parallel arrangement of a converter and a process control circuit receives these coded position signals. The outputs of the converter and process control circuit control the actuators of the automation system through pulse converters and positioning control circuits (e.g. speed and position control loops). Information as to the number of press strokes is also provided to the pulse converters through a generator. The converter can be an electronic curve shaper which controls the actuators when the press ram is moving, while the process control circuit can be a CNC control circuit which controls the actuators when the press ram is stopped.

9 Claims, 2 Drawing Figures

CONTROL CIRCUIT FOR AN AUTOMATED PRESS SYSTEM

BACKGROUND OF THE INVENTION

The invention relates to a circuit arrangement for an automated press system.

A known circuit arrangement for automated press control is described in U.S. Pat. No. 3,668,498. The circuit arrangement set forth there is provided with a numeric control system based on a digital incremental design. In this arrangement a pulse generator coupled to the press drive produces pulses, the number of which is proportional to the travel of a press ram at the crank circle. These pulses are fed to an evaluation circuit, and have an indirect effect that the actuators, and thus the automation system, follow an operating characteristic, which is predetermined by preprogrammable set points. For example, the operation can be controlled through positioning control circuits, such as speed/position control loops. The points which must be approached individually are set as counters which are fed with the pulses from the pulse generator. Furthermore, a matrix circuit is used to determine check points which can only be passed by the automation system when the press ram has reached a certain position, as established by the crank circle.

The operation described above is accomplished by comparison devices which are components of the evaluation circuit, in that the positioning control circuits are actuated only when the system moves up to the set points and the new data for the next set point can be read out. This circuit arrangement presupposes continuous press operation, whereas the automation system is run in start/stop mode.

This state-of-the-art circuit arrangement is characterized by high component expenditure, extensive programming, which essentially must be done manually, and the imperfect attempt to reproduce a synchronized press line with mechanically firmly-coupled automation systems such as that described in U.S. Pat. Nos. 3,199,439 and 3,199,443. The deficiencies of this arrangement are that the limited number of set and check points which it permits and the associated operating characteristic which can be changed within the limits. The limitation in the number of set and check points is determined by the number of counters in the evaluation circuit, or, in other words, by the amount of circuitry involved. In addition, operational reliability is adversely affected by the possibility that pulses from the pulse generator can get lost during transmission to the evaluation circuit, or that additional noise pulses can be transmitted, resulting in a wrong position allocation for the press ram. This also results in shortcomings in producing synchronous conditions between the press and the automation system.

SUMMARY OF THE INVENTION

It is the basic object of the invention, therefore, to produce a circuit arrangement for an automated press which ensures that the actual position of the press ram is allocated directly to an operating characteristic which can be predetermined by a path cam and which permits start/stop operation of the press and through which the speed of operation of the press or number of strokes executed by the press is matched automatically.

To accomplish these and other objects, the present invention provides a circuit arrangement for an automated press system in which a pulse generator coupled to the press controls positioning control circuits for moving the objects being pressed via an evaluation circuit in dependence on the speed of operation of the press. The positioning control circuits drive actuators of the automation system in accordance with a predetermined operating characteristic by moving up to programmable set points. The pulse generator produces directly-coded actuating signals indicative of a press ram position. The evaluation circuit includes a converter arranged in parallel with a process control circuit. The outputs of these converter and control circuits are connected to pulse converters which are provided for each actuator. These pulse converters are also fed with control pulses from a generator which detects the number of strokes executed by the press. Based on these inputs, the outputs of the pulse converters are connected to the positioning control circuits provided for each of the actuators to control the actuators.

An advantage of the circuit arrangement according to the invention is produced by the accurate reproduction of the coupling curve which can be achieved by mechanical coupling, by electronic means and by acting on the automation system actuators automatically and in dependence on the number of strokes. A further advantage can be seen in that the press can be run in a start/stop mode, with the automation system being moved independently of the press while the press is standing still. The start/stop mode of operation extends the handling time for handling large and deep workpieces without increasing the stroke length of the press, which is required in the case of the state-of-the-art continuously-running presses. In practice, such increases in stroke length are limited by economic and structural considerations (i.e. expenditure, construction size).

BRIEF DESCRIPTION OF THE DRAWING

In the description which follows, an illustrative embodiment of the invention is explained in greater detail with the aid of a drawing, in which.

DETAILED DESCRIPTION OF THE PREFERRED EMBODIMENTS

Figure 1:
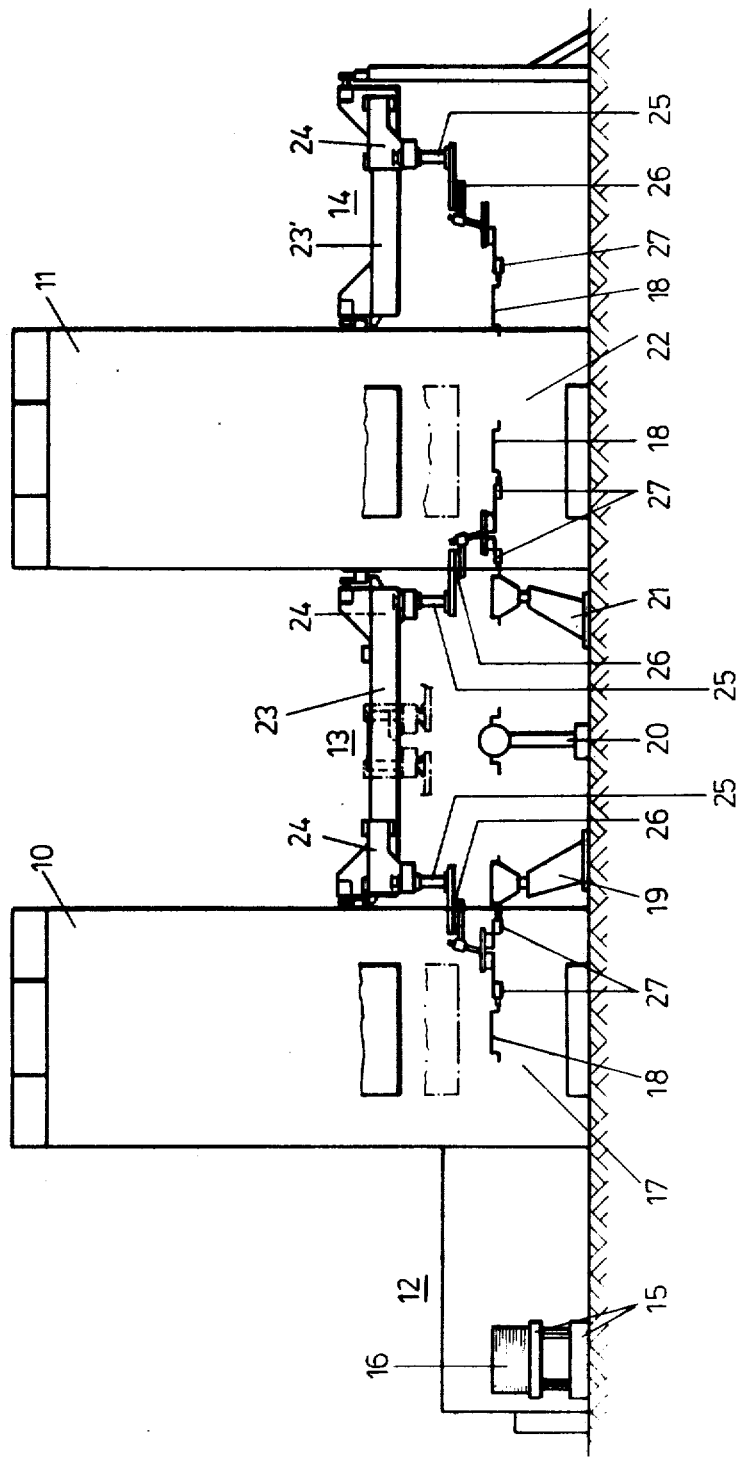
FIG. 1 shows an automated press arrangement.

Turning now to the drawing, the press arrangement shown in FIG. 1 is constructed of a first press 10, a second press 11 and an associated automation system including an unloading device 12, a conveyor 13 and a discharge device 14. The unloading device 12 contains, for example, lift tables 15, one of which is shown, on which sheet metal blanks 16 are stacked. The blanks are conveyed into a tool space 17 of the first press 10 by means of a blank loading device which can be constructed, for example, in accordance with United States Patent Application Ser. No. 000,981 which is commonly owned by the assignee of the present invention and which is herein incorporated by reference.

The part 18 formed in the first press 10 from a blank 16 is brought by the conveyor 13 via a first intermediate stacker 19, a rotating stacker 20 or a further stacker and a second intermediate stacker 21 into a tool space 22 of the second press 11. After processing in the second press 11, the finished part 18 is conveyed out of the tool space 22 of the second press 11 by means of a discharge device 14. The discharge device 14 is constructed, for example, as in the commonly owned United States Patent Application Ser. No. 972,214 which is herein incorporated by reference. The conveyor 13 is explained in greater detail in this related application and represents all three automation devices which, in principle, can consist of the same components.

On each side of a guide rail 23, which is arranged as an overhead support frame between the first press 10 and the second press 11, one conveying carriage 24 each is supported in such a manner that it can be moved horizontally. Furthermore, a conveying carriage 24 is provided with a lift guide 25 which transmits a vertical movement and to which a support 26 is attached to which, in turn, pairs of opposite controllable gripper elements 27 are attached which point in opposite directions and the position of which can be adjusted. The gripper elements 27 used can be gripper tongs, magnetically-acting lift elements, lift elements working on the vacuum principle, or other conventional combinations of gripper tongs and lift elements. For special applications, a conveyor belt can also be used instead of stackers 19, 20 and 21. The components shown in the discharge device 14 which are equivalent to those shown in the conveyor 13 are given the same reference designations, although it should be noted that guide rail 23' is attached only to the second press 11 and carries only one conveying carriage 24.

Figure 2:
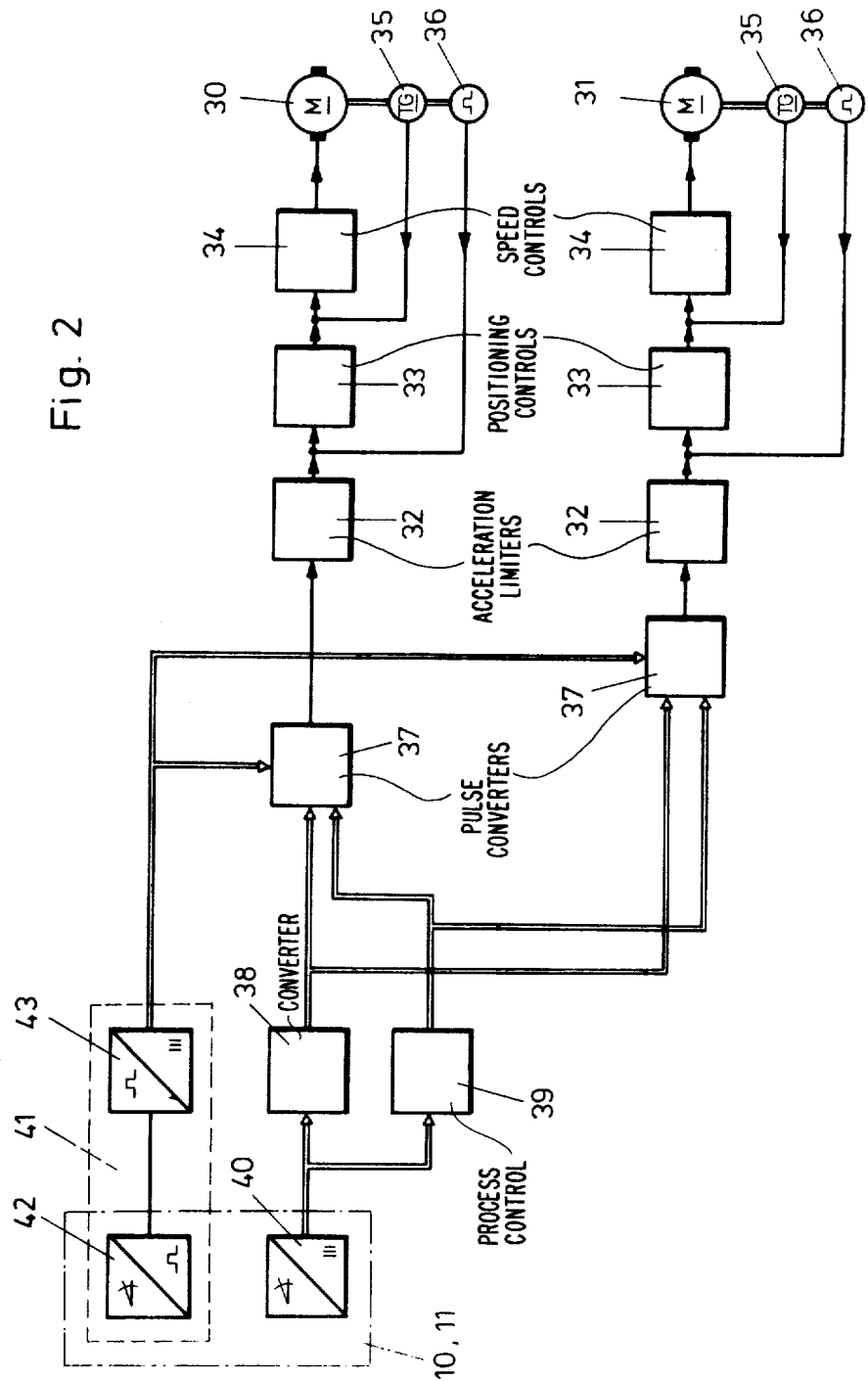
FIG. 2 shows a block diagram of a circuit arrangement for an automated press arrangement.

Each conveying carriage 24 is equipped with two actuators—a direct-current servo drive 30 for the horizontal movement and a direct-current servo drive 31 for the vertical movement (FIG. 2). The direct-current servo drives 30 and 31 are associated with the commonly used positioning control circuits which each includes an acceleration limiter 32 which permits accelerations and decelerations according to an exponential function, a positioning control 33 and a speed control 34 or current rectifier. The actual speed value is generated by a tacho-generator 35 and the actual position value is supplied by an incremental pulse generator 36. The positioning control circuits, containing the speed/position control loops, operate on an analog base.

Each of the positioning control circuits is preceded by a pulse converter 37. The pulse converters 37, in turn, are connected, via data channels, to an evaluation circuit made up of a converter 38 and a process control circuit 39. The converter 38 can be an electronic curve shaper such as, for example, that manufactured by A.S.R. Servotron under the name Syndexer Industrial Positioning System. The process control circuit 39 can be a commercially available multi-axis CNC control system. The pulse converters 37 are essentially digital to analog converters, the operation of which is explained in greater detail hereunder. The evaluation circuit itself is also fed, via data channels, from an absolute angle step generator 40, which produces directly coded position signals of the press rams of the presses 10 and 11, related to the crank circle. These position signals can be generated, for example, in Grey code and converted into BCD code, being continuously transmitted.

The pulse converters 37 are also fed with control pulses via data channels fed by a generator 41, these control pulses representing a measure of the number of strokes executed by the presses 10 and 11, and thus of the speed of operation. The generator 41 includes an incremental pulse generator 42 and a converter 43 which senses the speed and converts it into code.

The circuit arrangement shown in FIG. 2 is designed for a conveying carriage 24 equipped with the one direct-current servo drive 30 for the horizontal movement and another direct-current drive 31 for the vertical movement, which means that each conveying carriage 24 is in itself associated with such a circuit arrangement.

From the absolute angle step generator 40, directly coded position signals of the press rams of the presses 10 and 11 continuously reach the converter 38, on the one hand, and the process control circuit 39, on the other hand, via a data channel (data bus). In the converter 38, each position signal is used to simulate a curve, the form of which can be freely selected and which is an exact, electronic simulation of a mechanical cam. This curve determines the movement characteristic of the automation system, particularly of the conveying carriage 24, during the operation of the presses 10 and 11. If the presses 10 and 11, however, are not operated in the continuous mode, the electronic curve determining the movement characteristic of the conveying carriages 24 is supplied by the process control circuit 39 during the standstill phase of the presses 10 and 11. The coded values corresponding to the curve outputs are fed in parallel from the converter 38 or from the process control circuit 39 via further data channels (data bus) to the pulse converters 37.

Each pulse converter converts the coded values corresponding to the curve into a sequence of control pulses, the number of control pulses being proportional to the respective portion of the curve to be travelled and the frequency of the control pulse sequence determining the speed at which the system moves along the respective portion of the curve. The frequencies of the control pulse sequences are determined by the data on the speed of the press ram obtained by the generator 41. The control pulse sequences represent analog signals which can be processed directly in the speed/position control loops formed by elements 32, 33, 34, 35, and 36 of the direct-current servo drives 30 and 31.

If the presses 10 and 11 are operating in a continuous mode, the curves determining the movement characteristic of the conveying carriages 24, or of the automation systems, respectively, are exclusively determined by the existing converters 38. In the start/stop mode, however, during the stroke of the presses 10 and 11 the curves are determined by the converters 38, while during the standstill phases of the presses 10 and 11 they are predetermined by the process control circuit 39. This makes it possible to move the automation system in an optimum manner and at the smallest possible safety distances to the presses 10 and 11 or their rams, respectively. This, in turn, makes it possible to shorten the conveying phases.

The start/stop operation of the presses 10 and 11 using the principles of the present invention results in an extension of the time of conveying the parts 18 into the areas of the tool spaces 17 and 22 without having to alter the structure of the presses, which would be necessary with automated press arrangements operated in a continuous mode. In principle, these alterations would have to take the form of increasing the length of the stroke. This measure would be necessary for processing relatively large and deep parts.

Although the above arrangement shows the generator 41 as a separate unit from generator 40, it should be understood that the generator 41 which senses the ram speed can also be a component of the absolute angle step generator 40.

With the circuit arrangement according to the invention, the curves, and thus the movement characteristics of the automation systems 12, 13, and 14, can be adapted in an optimum manner to the parts 18 to be produced, and thus also to the constructional characteristics of the tools used (not shown) in a simple manner by changing the programming. Such programming changes can be implemented, for example, by exchanging a program cassette. The parallel arrangement of the converter 38 and the process control circuit 39, and the control pulse sequences of the pulse converter 37 which are produced under control of the number of strokes, permit the automation systems 12, 13, and 14 to be operated continuously both during continuous operation and during start/stop operation of the presses 10 and 11. In this way unnecessary jumps are avoided in acceleration or deceleration which jumps can lead to impairment to the quality of the parts to be produced (for example by deformation).

It is to be understood that the above-described arrangements are simply illustrative of the application of the principles of this invention. Numerous other arrangements may be readily devised by those skilled in the art which embody the principles of this invention and fall within its spirit and scope.

We claim:

1. A circuit arrangement for an automated press system having a press ram and a press automation system in which a pulse generator coupled to the press enables positioning control circuits via an evaluation circuit in dependence on the speed of operation of the press, said positioning control circuits driving actuators of the press automation system and the automation system following a predetermined operating charcteristic by moving up to programmable set points, the pulse generator produces directly-coded actuating signals indicative of the position of the press ram, that the evaluation circuit includes a converter in parallel with a process control circuit, the inputs of said converter and process control circuit coupled to the pulse generator output and the outputs of said converter and process control circuit being connected to one or more pulse converters for said actuators, that the pulse converters are fed with control pulses from a generator which detects the number of strokes executed by the press, and that the outputs of the pulse converters are connected to said positioning control circuits for driving said actuators.

2. A circuit arrangement according to claim 1, wherein the converter is an electronic curve shaper, the curve of which can be freely selected.

3. A circuit arrangement according to claim 1, wherein the process control circuit is a CNC control system.

4. A circuit arrangement according to claim 1, wherein the generator comprises a tacho-generator and an analog to digital converter.

5. A circuit arrangement according to claim 1, wherein said pulse generator is an angle step generator.

6. A circuit arrangement according to claim 1, wherein said positioning control circuits are speed and position control loops.

7. A circuit arrangement according to claim 2, wherein the process control circuit is a CNC control system, and further wherein the converter controls the actuators in accordance with the electronic curve via the pulse converters and positioning control circuits when the press ram is moving while the process control circuit controls the actuators when the press ram is stopped.

8. A circuit arrangement for an automated press system having a press ram and a press automation system including actuators which are controlled by positioning control circuits, comprising:

means coupled to the press for indicating the position of the press ram;

a converter coupled to said press ram position indicating means and said positioning control circuits for controlling the actuators when the press ram is moving; and a process control circuit coupled to said press ram position indicating means and said positioning control circuits for controlling the actuators when the press ram is stopped.

9. A circuit arrangement according to claim 8, wherein the press ram position indicating means comprises an angle step generator for producing coded signals indicative of the press ram position in accordance with press speed signals received from the press.

* * * * *